April 5, 1955  B. E. LOCKWOOD  2,705,619
BEATER EJECTOR FOR FOOD MIXER
Filed July 27, 1953
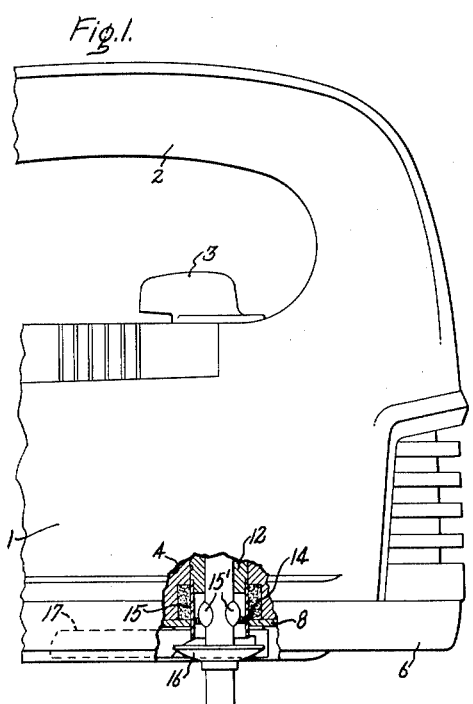
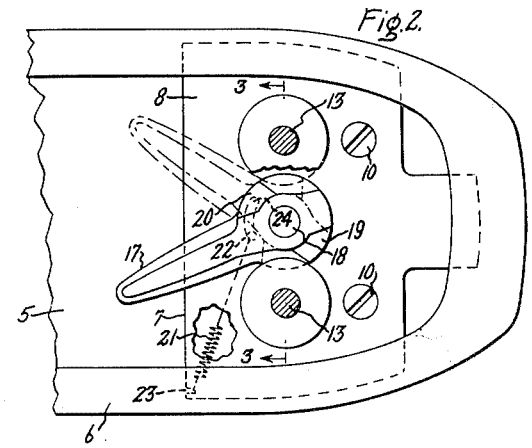
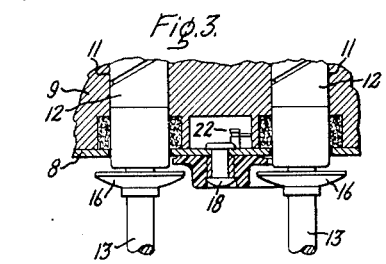
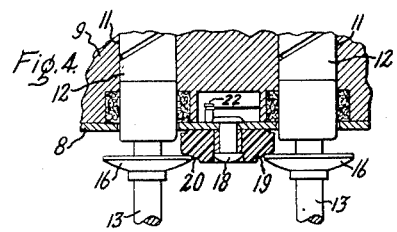
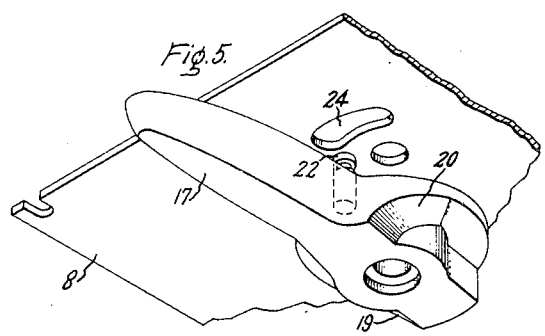
Inventor:
Burt E. Lockwood,
by His Attorney.

United States Patent Office 2,705,619
Patented Apr. 5, 1955

2,705,619

BEATER EJECTOR FOR FOOD MIXER

Burt E. Lockwood, Brockport, N. Y., assignor to General Electric Company, a corporation of New York Application July 27, 1953, Serial No. 370,369

2 Claims. (Cl. 259—1)

The present invention relates to beater ejectors for food mixers and has for its object to provide an improved beater ejector which is simple in structure, easy and handy to operate, capable of being provided at low cost, and is for the most part concealed within the confines of the mixer casing base flange where it is out of the way and does not detract from the appearance of the mixer or interfere with its styling.

According to the invention, I provide an ejector which is in the form of a lever pivoted up against the base or bottom wall of the mixer casing within the confines of the base flange and between the two beaters of the mixer, the lever being provided with cams adapted to engage the top surfaces of the batter guards of the beaters to force the beaters down out of their driving sockets.

In the drawing:

Fig. 1 is a side view, partly in section, of a food mixer equipped with a beater ejector embodying the invention;

Fig. 2 is a detail plan view looking toward the underside of the mixer base;

Fig. 3 is a detail sectional view taken on line 3—3, Fig. 2;

Fig. 4 is a view similar to Fig. 3 showing the parts in a different position;

Fig. 5 is an exploded perspective view of certain parts.

Referring to the drawing, 1 indicates the power unit of the food mixer, 2 the handle, and 3 the electric control switch. The power unit comprises an outer casing 4 having an open bottom closed by a flat bottom plate 5 fastened to casing 4 by suitable means (not shown). Between plate 5 and the edge of casing 4 is a resilient gasket 6 formed from rubber, for example, which projects below plate 5 to form a surrounding base flange. In plate 5 is an opening 7 which is closed by a cover plate 8 which in substance forms a part of plate 5. Cover plate 8 is attached to the bottom of a bearing block 9 by screws 10. Bearing block 9 forms a part of the mixer framework. In the bearing block are two spaced openings 11 in which are journaled spindles 12 driven through gearing from the shaft of the mixer electric motor. Spindles 12 are provided with means for detachably holding beaters 13. In the present instance, a detachable holding means similar to that disclosed in the patent to Stiles, 2,325,434, patented July 27, 1943, and assigned to the same assignee as the instant application, is shown. It comprises a radially yielding spring ring 14 positioned in a sleeve 15 at the lower end of the spindle with which ears 15' on the beater shaft engage to hold the shaft in place. Ears 15' are rounded as shown clearly in Fig. 1 and can be pushed past the spring when the beater shaft is inserted into the driving spindle and pulled past it when the beaters are to be ejected. The spring has a strength to give the desired holding force. On the beater shaft are batter guards 16 which serve to prevent material being mixed from creeping up the beater shaft into the spindle.

The food mixer structure so far described forms no part of my invention. It is to be taken as typical of any suitable food mixer structure having yieldingly held beaters which can be ejected by downward pressure.

My invention has to do with improved means for ejecting the beaters from their spindles. For this purpose, I provide an ejector lever 17 pivotally mounted on cover plate 8 by a pivot pin 18 which may comprise a rivet as shown clearly in Figs. 3 and 4. Lever 17 has a head shaped to define two cam surfaces 19 and 20 which overlie batter guards 16 and which when the lever is turned are adapted to ride against the batter guards to force beaters 13 simultaneously downward to move ears 15 down past springs 14, thus detaching the beaters from the driving spindles. Lever 17 is biased to a position where the cams are out of engagement with the batter guards (i. e., where the low points of the cams are over the batter guards) by a spring 21 which at one end is connected to a pin 22 carried by lever 17 and at the other end to a corner of cover plate 8 as indicated at 23 in Fig. 2. Pin 22 may to advantage be formed integral with lever 17. It projects up through an arcuate slot 24 in cover plate 8, the ends of the slot cooperating with the pin to limit movement of lever 17 in each direction. By this arrangement the biasing spring is positioned inside the mixer housing where it is out of the way; and means for limiting the lever movement is obtained by the very simple expedient of extending a pin connected to the lever up through an arcuate slot in the cover plate.

Normally, spring 21 holds lever 17 in the full line position shown in Fig. 2 in which position the low points of cams 19 and 20 are in line with batter guards 16. The cams are brought into engagement with the batter guards to release the beaters when lever 17 is moved to the dotted line position shown in Fig. 2.

By my invention there is provided a beater ejector structure which is unusually simple so it can be provided at low cost and one which can be quickly and easily assembled on the mixer, it being necessary merely to pivot it to the cover plate and attach the biasing spring. Since the lever is fastened directly against the underside of the cover plate, it is out of the way and is for the most part concealed by surrounding gasket 6 so it is not conspicuous and does not detract from the styling of the mixer.

What I claim as new and desire to secure by Letters Patent of the United States is:

1. In a food mixer, a power unit having a bottom casing wall, a gasket surrounding said bottom wall and projecting below said wall, rotating spindles driven by the power unit, beaters driven by the spindles, yielding means detachably connecting the beaters to said spindles, said beaters having collars adjacent said bottom casing wall, and ejector means for releasing the beaters from said spindles comprising a lever pivoted on said bottom casing wall between the beaters for movement in a plane parallel to said wall, said lever being provided with cam surfaces on the bottom portion thereof for engaging said collars when the lever is turned to effect downward movement and ejection of said beaters, said lever being at least partially concealed from view by said downwardly projecting gasket.

2. In a food mixer, a power unit having a bottom casing wall, rotating spindles driven by the power unit, beaters driven by the spindles, yielding means detachably connecting the beaters to said spindles, said beaters having collars adjacent said bottom casing wall, ejector means for releasing the beaters from said spindles comprising a lever pivoted against the outer surface of said bottom casing wall between said spindles to turn in a plane parallel to said bottom casing wall, said lever being provided with cam surfaces on the bottom portion thereof adapted to engage said collars when the lever is turned for effecting downward movement and ejection of said beaters, means for limiting the movement of said lever comprising an arcuate slot in said wall and a pin carried by said lever and projecting upwardly through said slot, said pin being arranged to engage the ends of said slot for limiting the movement of said lever in each direction, and a spring connected to said pin and to said casing within said casing for biasing said lever to one extreme position wherein said cams are out of engagement with said collars.

References Cited in the file of this patent

UNITED STATES PATENTS

| | | |
|---|---|---|
| 2,048,455 | Knapp | July 21, 1936 |
| 2,552,023 | Andresen | May 8, 1951 |
| 2,566,907 | Robertson | Sept. 4, 1951 |
| 2,615,942 | Edman | Oct. 28, 1952 |